April 21, 1970          P. D. HANN          3,507,776

ISOMERIZATION OF HIGH FREEZE POINT NORMAL PARAFFINS

Filed Dec. 29, 1967

INVENTOR.
P. D. HANN
BY
ATTORNEYS

United States Patent Office 3,507,776
Patented Apr. 21, 1970

3,507,776
ISOMERIZATION OF HIGH FREEZE POINT NORMAL PARAFFINS
Paul D. Hann, Bartlesville, Okla., assignor to Phillips Petroleum Company, a corporation of Delaware
Filed Dec. 29, 1967, Ser. No. 694,597
Int. Cl. C10g 35/00, 35/04
U.S. Cl. 208—85                                    3 Claims

ABSTRACT OF THE DISCLOSURE

The properties of hydrocarbon mixtures are improved; e.g., freezing point is reduced, by separating normal paraffins from said mixture, selectively isomerizing higher freezing point normal paraffins, e.g., higher molecular weight normal paraffins, to isoparaffins, and blending the isomerized and unisomerized normal paraffins with the remainder of the mixture.

BACKGROUND OF THE INVENTION

Figure 1:
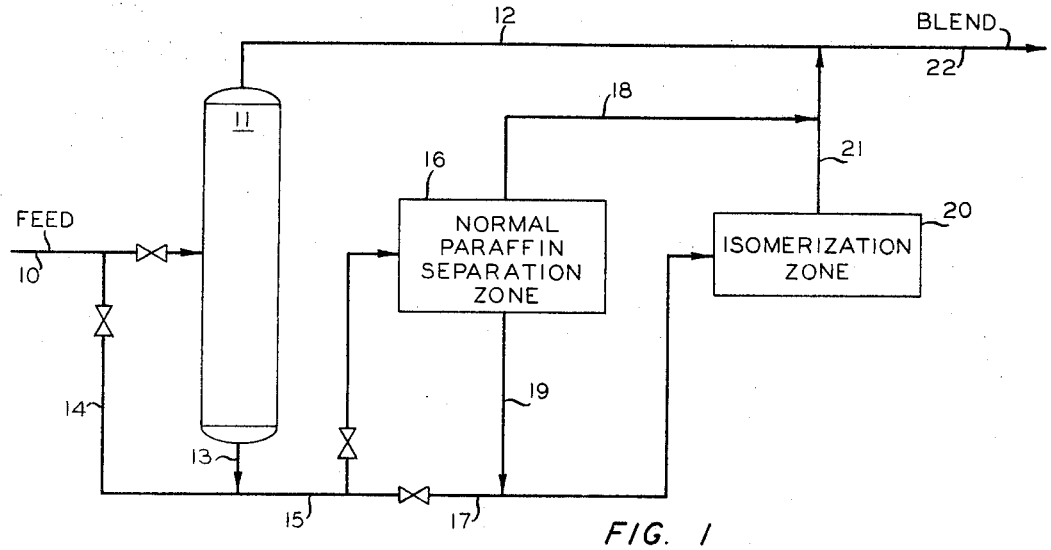

Hydrocarbon fuels of all varieties are required to have certain qualities which make their application desirable in particular situations. For the most part, the qualities which any fuel should have will be determined by the manner and environment in which it is employed. This is particularly true of fuels for internal combustion engines, jet engines, and, in particular, turbo-jet engines. Even within these categories there is considerable diversity of operational and environmental factors which require differences in fuel qualities. For example, several of the qualities of fuels designed for automotive engines would render those fuels undesirable for use in aircraft power plants whether they be reciprocating or turbojet engines.

The requirements of certain fuel characteristics are most strict where the consequences of fuel system or engine failure are most severe which is the case with aircraft power plants. Strict adherence to critical fuel specifications is even more important where the fuels are destined for use in high performance aircraft powered by turbojet engines. The fuel systems and power plants of such aircraft are subject to extreme operational stress and radical variation of environmental conditions such as temperature and pressure. Due to the fact that these systems are frequently exposed to extremely low temperatures, it is necessary to require strict adherence to very low freezing point requirements for the hydrocarbon fuels employed in these power plants. For example, the Air Force presently specifies freezing points of −72° F. maximum for certain grades of jet fuel, e.g., JP-4 jet fuel. However, at the same time, these fuels must meet equally critical specifications of voltaility, rate of combustion, heat release on combustion, temperature stability, etc. As a result, fabrication of such a fuel is quite a complex matter requiring the strict observance of numerous product characteristics and process variables. It is to these difficulties that this invention relates.

I have discovered that certain essential qualities of hydrocarbon fuels can be improved without detracting substantially from the quality of such fuels in other respects. In this respect, I have discovered a process whereby the freezing point of hydrocarbon fuels can be substantially reduced while minimizing the alteration of other essential fuels qualities.

For example, it is now known that the freezing point of hydrocarbon mixtures containing paraffins can be reduced by isomerizing the normal parafins to isoparafins. The most substantial degree of freezing point reduction is accomplished in view of this knowledge by isomerizing either the total hydrocarbon mixture or the total normal paraffinic content thereof. However, there are several characteristics of normal paraffins that make their use in certain fuels, particularly turbojet engine fuels, highly desirable. Several of these characteristics are discussed by Sylvester C. Britton in U.S. Patent 2,698,511. For example, Britton points out that the presence of normal paraffins results in greater combustion efficiency and reduction in localized overheating of turbine blades. In view of these observations, it is apparent that reduction in freezing point and the retention of other desirable characteristics such as combustion efficiency and elimination of localized overheating of engine parts are conflicting objectives which require, in some instances, opposite procedures. I have found that the most beneficial combination of these fuel charactaristics can be maintained by the process of this invention.

It is, therefore, one object of this invention to provide an improved method for processing hydrocarbon mixtures.

It is another object of this invention to provide a method for reducing the freezing point of hydrocarbon mixtures.

It is another object of this invention to provide a method for selectively reducing the concentration of relatively high boiling normal parafinic constituents in hydrocarbon mixtures.

It is still another object of this invention to remove relatively high freezing point normal paraffins from hydrocarbon mixtures while retaining normal paraffinic hydrocarbons which are not detrimental to the desired freezing point characteristics.

SUMMARY OF THE INVENTION

In accordance with one embodiment of this invention, at least a portion of the higher freezing point normal paraffinic hydrocarbon is removed from a mixture thereof with other hydrocarbon and iomerized to lower freezing point isoparaffins which are in turn blended with the remainder of the hydrocarbon mixture.

In accordance with another embodiment of this invention, the freezing point of hydrocarbon mixtures containing relaitvely high freezing point normal paraffinic constituents is reduced by removing a substantial amount of the normal paraffins, separating the relatively higher freezing point normal paraffins from the relatively lower freezing point normal paraffins, isomerizing the higher freezing point constituents to isoparaffins having relatively lower freezing points and blending the isomerized product and unisomerized lower freezing point normal paraffins with the remainder of the original mixture.

DESCRIPTION OF THE PREFERRED EMBODIMENTS

The method of this invention can be employed on any mixture of hydrocarbons containing relatively high freezing point normal paraffinic constituents wherein it is desired to reduce the freezing point of the mixture. This method is particularly advantageous for the treatment of high performance jet fuels where it is necessary to meet strict freezing point specifications.

These hydrocarbon mixtures generally comprise hydrocarbons having from 8 to about 14 carbon atoms per molecule comprised of normal and isoparaffinic, olefinic, and aromatic hydrocarbons. The freezing point of these mixtures can be reduced substantially by converting the normal paraffinic constituents, having relatively higher freezing points, to isomeric constituents, having relatively lower freezing points, so that the final blend will meet the freezing point specification.

In one embodiment of this invention, this result is accomplished by separating a predetermined amount of the higher boiling normal paraffinc hydrocarbons from the original mixture and isomerizing this relatively higher freezing point normal paraffin components. This separation of normal paraffins can be accomplished by urea extraction as described in U.S. Patent 2,855,390 (1958) by Champagnat et al.; urea-sulfolane extraction, as described in U.S. Patent application Ser. No. 675,203, filed Oct. 13, 1967, now U.S. Patent 3,448,040, issued June 3, 1969; and selective adsorption by suitable adsorbents such as molecular sieves as described in U.S. Patent 2,921,970 (1960) by F. E. Gilmore, or other methods known in the art. The resulting normal paraffin fraction having, for example, from 8 to 14 carbon atoms is preferably separated by fractionation to produce the fraction containing the relatively higher freezing point normal paraffins of 11 to 14 carbon atoms, and a second fraction containing the relatively lower freezing point normal paraffins of 8 to 10 carbon atoms. The lower freezing point paraffins can be blended with the remainder of the original mixture to increase the normal paraffinic content thereof without increasing the freezing point. A predetermined portion of the relatively higher freezing point normal paraffins is then isomerized to isoparaffins having relatively lower freezing points. The size of the fraction to be isomerized will, of course, depend upon the degree to which it is desired to lower the freezing point of the original mixture. This conclusion can be easily drawn by reference to the freezing points of normal paraffins present in the original mixture, the freezing points of isoparaffins having the same number of carbon atoms, and the degree of freezing point reduction desired.

The procedure of this invention has several substantial advantages. For example, a freezing point reduction can be realized by selectively isomerizing the higher freezing point normal paraffins to isoparaffins while retaining the benefit of lower freezing point paraffins which contribute to other desirable fuel properties. It is also possible in a presently preferred embodiment to achieve this result, or simply the partial isomerization of all normal paraffins, without converting isoparaffins to higher freezing point normal paraffins. Most of the widely used isomerization processes are known to be equilibrium controlled provided that sufficient time is allowed for a feed mixture to approach that equilibrium. As a result, the presence of substantial amounts of isoparaffins in the feed to isomerization will, in many instances, deter the conversion of normal paraffins to isoparaffins. Depending on initial isoparaffin concentration and operating conditions it is quite possible to produce an isomerizate having a higher normal paraffin concentration than was found in the original mixture. The presently preferred embodiment of this invention which provides for the isolation of higher freezing point normal paraffins and the isomerization of only that isolated fraction substantially avoids these problems.

The degree of improvement that can be achieved by this method is evidenced by the freezing point comparison presented in the following table.

FREEZING POINTS

| Normal Paraffins | Freezing Point, ° F. | Isoparaffinics | Range of Freezing Points, ° F.ᵃ |
| --- | --- | --- | --- |
| $C_8$ | −70 | $C_8$ | −167 to −215 |
| $C_9$ | −65 | $C_9$ | −112 to −180 |
| $C_{10}$ | −21 | $C_{10}$ | −103 to −157 |
| $C_{11}$ | −15 | $C_{11}$ | −135 |
| $C_{12}$ | +14 | $C_{12}$ | −94 |
| $C_{13}$ | +21 | $C_{13}$ | −85 |
| $C_{14}$ | +43 | $C_{14}$ | −70 |

ᵃ Depends on isomer formed.

The normal paraffins can be isomerized by any process suitable for converting normal paraffins to isoparaffins. One such process disclosed in U.S. Patent 3,260,762 employs a platinum-alumina catalyst comprising, for example, 0.375 weight percent platinum and 3.0 weight percent fluorine on alumina. Another process disclosed in U.S. Patent 2,792,650 employs a noble metal-boria-alumina catalyst comprising, for example, 0.01 to 2.0 weight percent platinum group noble metal and from 3.0 to 20 weight percent boria ($B_2O_3$) on activated alumina.

As a general rule, the degree of freezing point reduction that can be achieved by this process is indicated by the freezing point differential between the normal paraffin feed to isomerization and the isoparaffinic product. This differential will generally be within the range of from about 25 to about 135 Fahrenheit degrees, depending on the carbon number range of the normal paraffin feed.

Figure 2:
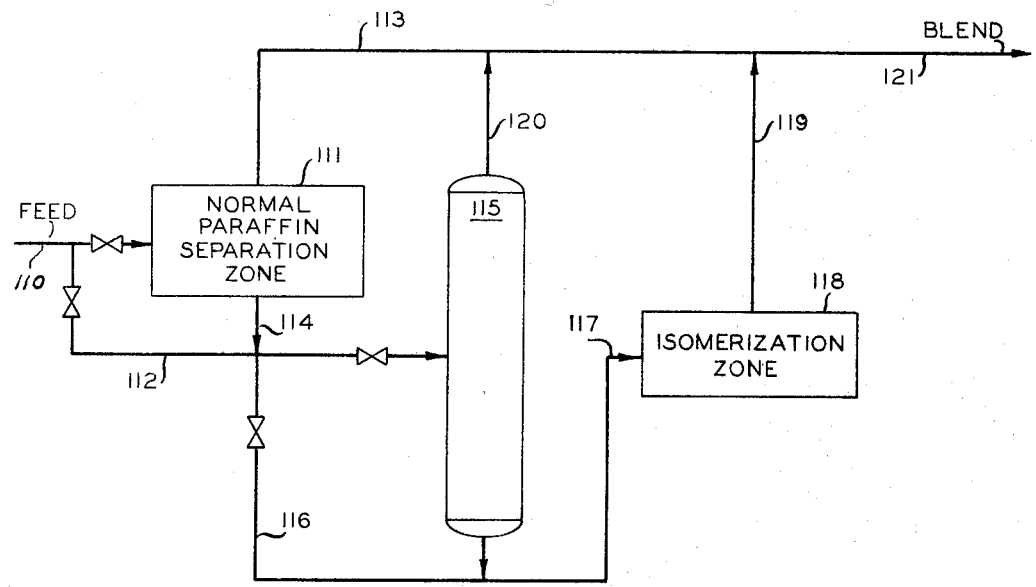

The invention is more fully described with reference to the attached drawings in which:

FIGURE 1 is a schematic diagram for fractionating the heavier components from the feed, removing the normal paraffins from this heavier components stream, and isomerizing these removed normal paraffins in accordance with this invention, and FIGURE 2 is a schematic diagram for removing normal paraffins, recovering the higher boiling normal paraffins, and isomerizing these higher boiling normal paraffins in accordance with this invention.

Referring now to FIGURE 1, a feed hydrocarbon, e.g., JP–4 jet fuel which does not pass freezing or pour point specification, is charged to the system by way of conduit 10. Preferably at least a portion of the lower boiling hydrocarbons are removed in fractionation column 11 by way of conduit 12. The heavier boiling components, having the relatively high freezing point normal paraffins therein is removed by way of conduit 13. If desired, a portion of the feed can bypass the fractionation zone by way of conduit 14. Conduit 15 passes at least a portion of the material to normal paraffin separation zone 16. If desired, at least a portion of the feed to zone 16 can by-pass this zone 16 by way of conduit 17. Non-normal paraffins are removed to the product blend by way of conduit 18. The portion containing the relatively higher freezing point normal paraffins is passed by way of conduit 19 to isomerization zone 20. The produced relatively lower freezing point isoparaffinics are removed from zone 20 by way of conduit 21 to the product blend 22 which passes the freezing point (as well as the other) specification.

Referring now to FIGURE 2, a feed hydrocarbon, e.g., JP–4 jet fuel which does not pass freezing or pour point specification, is charged to the system by way of conduit 110. If desired, at least a portion of the feed can by-pass the normal paraffin separation zone by way of conduit 112. From zone 111, non-normal paraffins are removed to product blend by way of conduit 113. Conduit 114 passes the normal paraffins to fractionator 115. If desired, at least a portion of the normal paraffinics can by-pass fractionator 115 by way of conduit 116. Lower boiling normal paraffinics are removed by way of conduit 119 to blend 120. The normal paraffinics are passed by way of conduit 117 to isomerization zone 118, and the relatively lower freezing point isoparaffinics are removed by way of conduit 119 to blend 121. This product blend 121 now passes all specifications including the freezing point specification.

The application of a method of this invention to a particular situation is illustrated by the following specific example.

SPECIFIC EXAMPLE

| | Broad range | Specific |
| --- | --- | --- |
| Catalyst for isomerization: | | |
|   Activated alumina, wt. percent | | 89.4 |
|   Platinum, wt. percent | | 0.6 |
|   Boria ($B_2O_3$), wt. percent | | 10.0 |
| Isomerization conditions: | | |
|   Temp., ° F | 400 to about 750 | 600 |
|   Press., p.s.i.g | 50 to 1000 | 500 |
|   Wt. hourly space velocity | 1 to 6 | 2.5 |
|   $H_2$/hydrocarbon mol ratio | 0.01:1 to 30:1 | 6:1 |
|   HCl, wt. percent of feed | 1 to 25 | 10 |

JP-4 Source

Distillation of Western Kansas crude oil, virgin cut, boiling range 220° F. initial boiling point, and 460° F. 90 percent distilled point. This jet fuel JP-4 passes all specifications except the pour or freezing point, which is too high at −70° F.

| Tests | Original JP-4 | Final JP-4 |
|---|---|---|
| Freezing Point, °F | −70 | −76 |
| API Gravity, at 60° F | 52.0 | 51.9 |
| ASTM Distillation, °F., percent Distilled: | | |
| IBP | 220 | 220 |
| 20 | 280 | 276 |
| 50 | 340 | 336 |
| 90 | 460 | 459 |
| Wt. percent Normal Paraffins | 35 | 15 |

The final blend is produced by charging 80 volume percent of the original JP-4 to a urea adduct producing zone (conditions known in the art: adducting at 80° F., breaking adduct at about 180° F.) to produce a normal paraffin concentrate and non-normal paraffin (raffinate).

The normal paraffinic concentrate is isomerized as set out above. The resulting isomerized portion is blended with the remaining non-normal paraffinic raffinate and the 20 volume percent of the original untreated JP-4 to produce the final JP-4 jet fuel blend which now passes pour or freezing point specification (as well as the other specifications).

The amount of JP-4 which requires treatment in accordance with the invention depends upon the freezing point of the original JP-4 jet fuel. That is, the greater the difference between the freezing point specification (−72° F.) and the freezing point of the original jet fuel, the greater will be the amount of jet fuel requiring treatment. This can be determined by laboratory testing.

I claim:

1. A method for improving the quality of hydrocarbon mixtures containing normal paraffins and substantially reducing the freezing point of said mixtures to a value which will meet jet fuel specifications, which method comprises separating at least a portion of the higher freezing point normal paraffins from the lower freezing point normal paraffins present in said hydrocarbon mixture which comprises hydrocarbons having from 8–14 carbon atoms per molecule comprised of normal and isoparaffinic olefinic and aromatic hydrocarbons at least partially isomerizing the thus separated, said higher freezing point normal paraffins to isoparaffins by contacting with an isomerization catalyst at isomerization conditions, and blending the resulting isomerized mixture with the remainder of said hydrocarbon mixture to form a jet fuel having a maximum freezing point of −72° F. and which also meets specifications for volatility, rate of combustion, heat release on combustion and temperature stability.

2. The method of claim 1 wherein said higher freezing point paraffins have about ten or more carbon atoms and are selectively isolated from the remainder of said hydrocarbon mixture prior to said isomerization.

3. The method of claim 1 wherein substantially all of said normal paraffins are separated from said mixture, said higher freezing point normal paraffins having at least 10 carbon atoms are separated from lower freezing point normal paraffins, a predetermined portion of said higher freezing point normal paraffins are isomerized to relatively lower freezing point isoparaffins and said lower freezing point normal paraffins, and isomerized paraffins are blended with the remainder of said mixture whereby the freezing point of said mixture is reduced to meet freezing point specification for jet fuel of −72° F. maximum.

References Cited

UNITED STATES PATENTS

| | | | |
|---|---|---|---|
| 3,231,489 | 1/1966 | Mahar | 208—15 |
| 3,308,052 | 3/1967 | Ireland et al. | 208—15 |
| 3,384,574 | 5/1968 | Halik et al. | 208—15 |
| 3,436,336 | 4/1969 | Ireland | 208—15 |

HERBERT LEVINE, Primary Examiner

U.S. Cl. X.R.

208—15, 93